(12) United States Patent
Kim et al.

(10) Patent No.: US 7,551,566 B2
(45) Date of Patent: Jun. 23, 2009

(54) APPARATUS AND METHOD FOR ID ALLOCATION IN MBMS MOBILE COMMUNICATION SYSTEM

(75) Inventors: Soeng-Hun Kim, Suwon-si (KR); Kook-Heui Lee, Yongin-si (KR); Sung-Ho Choi, Suwon-si (KR); Gert Jan Van Lieshout, Apeldoorn (NL)

(73) Assignee: Samsung Electronics Co., Ltd (KR)

( * ) Notice: Subject to any disclaimer, the term of this patent is extended or adjusted under 35 U.S.C. 154(b) by 598 days.

(21) Appl. No.: 10/957,815

(22) Filed: Oct. 4, 2004

(65) Prior Publication Data
US 2005/0073974 A1 Apr. 7, 2005

(30) Foreign Application Priority Data
Oct. 2, 2003 (KR) .................. 10-2003-0068947

(51) Int. Cl.
*H04L 1/00* (2006.01)
*H04L 12/26* (2006.01)
*H04W 72/00* (2009.01)
*H04W 74/00* (2009.01)

(52) U.S. Cl. .................. 370/252; 370/329; 370/337; 455/450; 455/451; 455/452; 455/509

(58) Field of Classification Search .............. 370/329, 370/253, 337; 455/450, 451, 452, 509
See application file for complete search history.

(56) References Cited

U.S. PATENT DOCUMENTS

| | | | |
|---|---|---|---|
| 6,898,429 B1 * | 5/2005 | Vialen et al. ............. | 455/432.1 |
| 2002/0025815 A1 * | 2/2002 | Rune et al. .............. | 455/436 |
| 2003/0134622 A1 | 7/2003 | Hsu et al. | |
| 2003/0207696 A1 * | 11/2003 | Willenegger et al. ...... | 455/522 |
| 2004/0057387 A1 * | 3/2004 | Yi et al. .................. | 370/252 |
| 2004/0117860 A1 * | 6/2004 | Yi et al. .................. | 725/147 |
| 2004/0156330 A1 | 8/2004 | Yi et al. | |
| 2005/0233760 A1 * | 10/2005 | Voltolina et al. ......... | 455/503 |

FOREIGN PATENT DOCUMENTS

EP  1 345 402  9/2003

OTHER PUBLICATIONS

3$^{rd}$ Generation Partnership Project: "Multimedia Broadcast/Multicast Service (MBMS); Architecture and Functional Description (Release 6)", Sep. 29, 2003.

* cited by examiner

*Primary Examiner*—Matthew D Anderson
*Assistant Examiner*—Wen W Huang
(74) *Attorney, Agent, or Firm*—The Farrell Law Firm, LLP

(57) ABSTRACT

An apparatus and a method for allocating identifiers (IDs) which differentiate data to be transmitted in a mobile communication system supporting the transmission of packet data. The method is used for allocating identifiers to packet data by a radio network controller (RNC) so as to differentiate packet data in a mobile communication system which includes the RNC and a user equipment (UE), wherein the RNC transmits the packet data to a certain cell through at least two common channels including at least two transport channels and the UE receives the packet data through the transport channel. The method includes the steps of: determining a transport channel for transmitting received packet data; and allocating dedicated identifiers for differentiating the pack data according to the determined transport channels.

14 Claims, 8 Drawing Sheets

APPARATUS AND METHOD FOR ID ALLOCATION IN MBMS MOBILE COMMUNICATION SYSTEM

PRIORITY

This application claims priority to an application entitled "Apparatus And Method For ID Allocation In MBMS Mobile Communication System" filed in the Korean Intellectual Property Office on Oct. 2, 2003 and assigned Ser. No. 2003-68947, the contents of which are incorporated herein by reference.

BACKGROUND OF THE INVENTION

1. Field of the Invention

The present invention relates to a mobile communication system which supports the transmission of packet data, and more particularly to an apparatus and a method for allocating identifiers (IDs) which differentiate data to be transmitted.

2. Description of the Related Art

FIG. 1 is a block diagram schematically illustrating a construction of a general mobile communication system.

The mobile communication system is a UMTS (Universal Mobile Terrestrial System) mobile communication system and includes a core network (CN) 100, multiple radio network subsystems (RNSs) 110 and 120, and a user element (UE) 130. Each of the RNSs 110 and 120 includes a radio network controller (RNC) and multiple base stations (node Bs). For instance, the RNS 110 includes an RNC 111, and node Bs 113 and 115, and the RNS 120 includes an RNC 112, and node Bs 114 and 116. Further, each of the RNCs 111 and 112 may be classified as a serving RNC (SRNC), a drift RNC (DRNC), or a controlling RNC (CRNC) according to an operation of each RNC. The SRNC represents an RNC for managing information of each UE and taking charge of data transmission with the CN 100. Further, when data of a UE is transmitted/received to/from an SRNC via another RNC other than the SRNC, the another RNC becomes the DRNC. The CRNC is an RNC for controlling each node B. When the RNC 111 manages the information of the UE 130 in FIG. 1, the RNC 111 operates as an SRNC with respect to the UE 130. Further, when the UE 130 moves and the data of the UE 130 are transceived through the RNC 112, the RNC 112 becomes a DRNC with respect to the UE 130 and the RNC 111 controlling the node B 113 communicating with the UE 130 becomes a CRNC of the node B 113.

The RNC and the node B are connected to each other through an Iub interface, the RNCs are connected to each other through an Iur interface, and the UE and a Universal Terrestrial Radio Access Network (UTRAN) are connected to each other through a Uu interface. The RNC allocates radio resources to multiple node Bs managed by the RNC and the node B provides the UE with radio resources which are allocated by the RNC. These radio resources are provided according to each cell, and radio resources provided by the node B represents radio resources regarding a specific cell controlled by the node B. The UE sets a radio channel by means of the radio resources regarding the specific cell controlled by the node B, and transmits/receives data by means of the set radio channel. Accordingly, since the UE recognizes only a physical channel provided according to (in relation to) each cell (thereof), a differentiation between a node B and a cell has no meaning. Hereinafter, the present invention interchangably uses the terms and node B cell.

In order to support multicasting multimedia communication, there is a broadcast/multicast service providing a service from one data source to a plurality of user equipments (UEs). The broadcast/multicast service may be classified as a cell broadcast service (CBS), a message-centered service, and a multimedia broadcast/multicast service (MBMS) providing multimedia such as a real-time image and voice, a still image, characters, etc.

When an MBMS is provided, it is assumed that the UE is one which wishes to receive the MBMS and the RNCs 111 and 112 transmit the MBMS.

In this case, the RNC 111 and 112 and the UE 130 construct an MBMS radio bearer with respect to the MBMS so as to process MBMS data.

Constructing the MBMS radio bearer means constructing a PDCP (Packet Data Convergence Control) entity, an RLC (Radio Link Control) entity, a Medium Access Control (MAC) entity, and a Physical Layer (PHY) entity for processing MBMS data.

Also, new logical channels called an MBMS traffic channel (MTCH) and an MBMS control channel (MCCH) have been introduced. The MTCH is a logical channel for transmitting user data for a specific MBMS and is constructed such that the number of the MTCH matches with the number of MBMSs provided in a cell. The MCCH is a channel for providing control information relating to an MBMS and one MCCH is constructed for each cell. The MCCH is transmitted using a common channel such as a secondary-common control physical channel (S-CCPCH).

Therefore, when a plurality of MBMSs are provided in a specific cell, the RNC inserts an MBMS identifier into relevant MBMS data and transmits the MBMS data. In this case, the MBMS data into each of which a relevant MBMS identifier is inserted are transmitted through a different S-CCPCH and FACH (Forward Access Channel) from each other.

According to the prior art with respect to this transmission, an identifier having a dedicated value is allocated to each cell.

For example, according to the prior art, while the maximum number of MBMSs which can be simultaneously provided in one cell may change depending on the environment of the cell and the types of services, 16 bits are allocated to an MBMS ID field for a dedicated identifier used in one cell, from the viewpoint of sufficiently providing reserve values.

However, when one identifier having a unique feature corresponding to a cell unit is allocated to each cell, the number of distinguishable MBMSs is limited to a small value. In other words, the prior art must transmit excessive information through a radio channel in order to differentiate service-available MBMSs. As a result, in the prior art limited radio resources are inefficiently used.

Therefore, in order to solve such a problem, it is necessary to provide a new method capable of allocating MBMS identifiers.

SUMMARY OF THE INVENTION

Accordingly, the present invention has been made to solve the above-mentioned problem occurring in the prior art, and an object of the present invention is to provide an apparatus and a method for decreasing the size of an identifier which is used to differentiate MBMSs in a mobile communication system supporting the MBMS.

Another object of the present invention is to provide an apparatus and a method for increasing the number of MBMSs which can be differentiated from each other by using identifiers having a uniform size in a mobile communication system supporting the MBMS.

Still another object of the present invention is to provide an apparatus and a method for efficiently utilizing radio resources by decreasing the size of an identifier which is used to differentiate MBMSs.

To accomplish these and other objects, in accordance with an aspect of the present invention, there is provided a method for allocating identifiers to packet data by a radio network controller (RNC) so as to differentiate packet data services in a mobile communication system which includes the RNC for supporting the packet data services and a user equipment (UE) being provided with the packet data service transmitted from the RNC, the method including the steps of: allocating dedicated identifiers, which are not overlapped with each other, to the packet data by the RNC so as to differentiate the packet data in a transport channel through which the packet data are transmitted; and transmitting the packet data including the dedicated identifier to the UE through a determined transport channel.

In accordance with another aspect of the present invention, there is provided a method for allocating identifiers to packet data by a radio network controller (RNC) so as to differentiate packet data services in a mobile communication system which includes the RNC for supporting the packet data services and a user equipment (UE) for receiving the packet data service transmitted from the RNC, the method including the steps of: determining a transport channel for transmitting received packet data; generating an identifier that is not overlapped with identifiers which are allocated to the respective packet data services transmitted through a common channel including the determined transport channel; and allocating the generated identifier to the received packet data service and transmitting the packet data service having been allocated the identifier through the determined channel.

In accordance with still another aspect of the present invention, there is provided a method for allocating identifiers to packet data by a radio network controller (RNC) so as to differentiate packet data in a mobile communication system which includes the RNC and a user equipment (UE), wherein the RNC transmits the packet data to a certain cell through at least two common channels including at least two transport channels and the UE receives the packet data through the transport channel, the method including the steps of: determining a transport channel for transmitting received packet data; generating an identifier that is not overlapped with identifiers which are allocated to packet data being transmitted through the determined transport channel; and allocating the generated identifier to the packet data to be transmitted.

In accordance with still another aspect of the present invention, there is provided an apparatus for allocating identifiers to packet data by a radio network controller (RNC) so as to differentiate packet data services in a mobile communication system which includes the RNC for supporting the packet data services and a user equipment (UE) for receiving the packet data service transmitted from the RNC, the apparatus including : a storage unit for storing transport channels and identifiers which are allocated to packet data services transmitted through the respective transport channels; and a controller for determining a transport channel for transmitting received packet data and for generating an identifier that is not overlapped with identifiers which are allocated to each packet data service transmitted through the determined transport channel.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of an apparatus and a method for ID allocation in an MBMS (Multimedia Broadcast/Multicast Service) mobile communication system according to the present invention will be described with reference to the accompanying drawings. In the following description of the present invention, a detailed description of known functions and configurations incorporated herein will be omitted when it may obscure the subject matter of the present invention.

The present invention proposes a method of inserting an MBMS identifier by a MAC layer so that user equipment (UE) can differentiate relevant MBMSs in a mobile communication system supporting MBMSs.

In order to solve the problem of the prior art in relation to the method, (the present invention proposes a method) of allocating identifiers each of which has a unique feature in one cell, rather than allocating identifiers to differentiate MBMSs in a radio channel.

Figure 1:
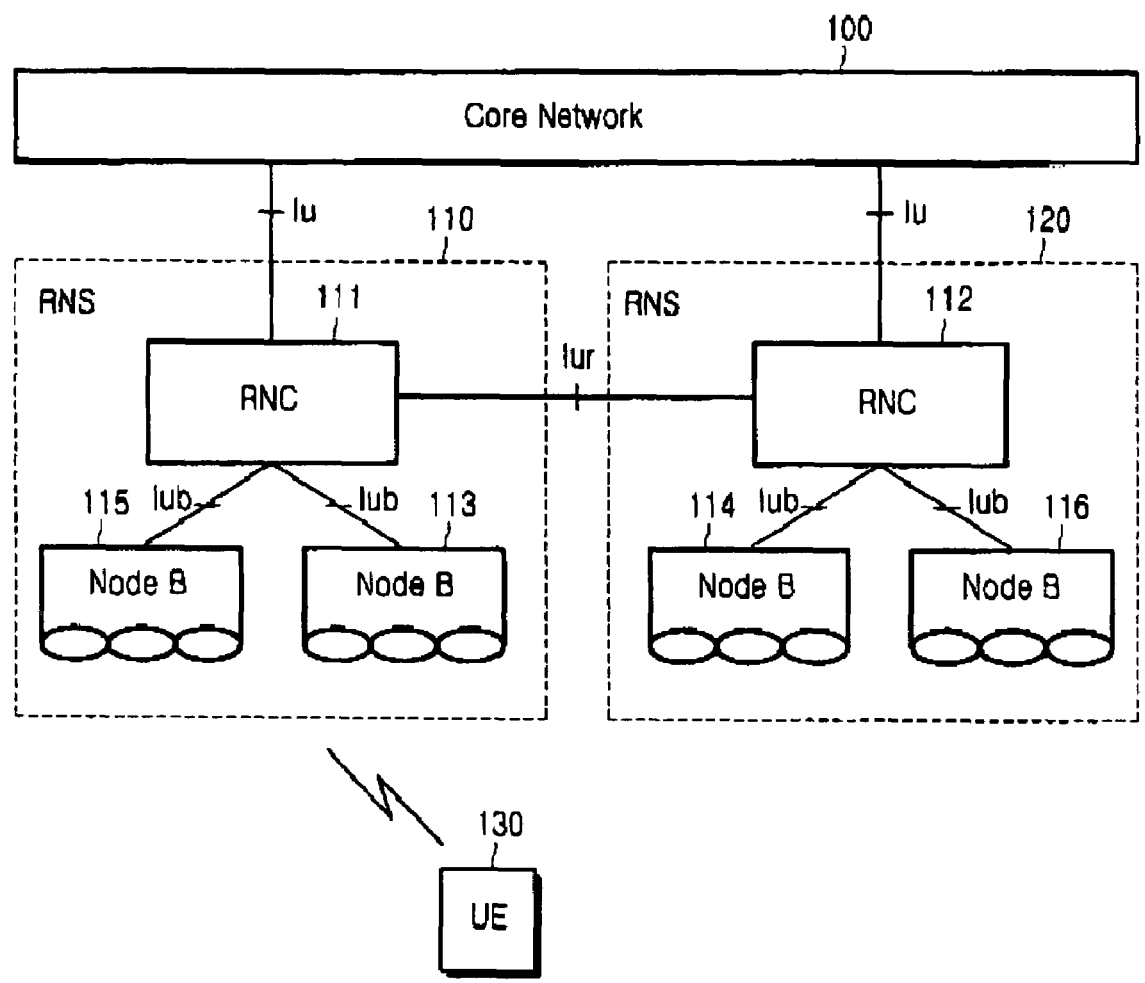
FIG. 1 is a block diagram illustrating a construction of a general mobile communication system.
Figure 2:
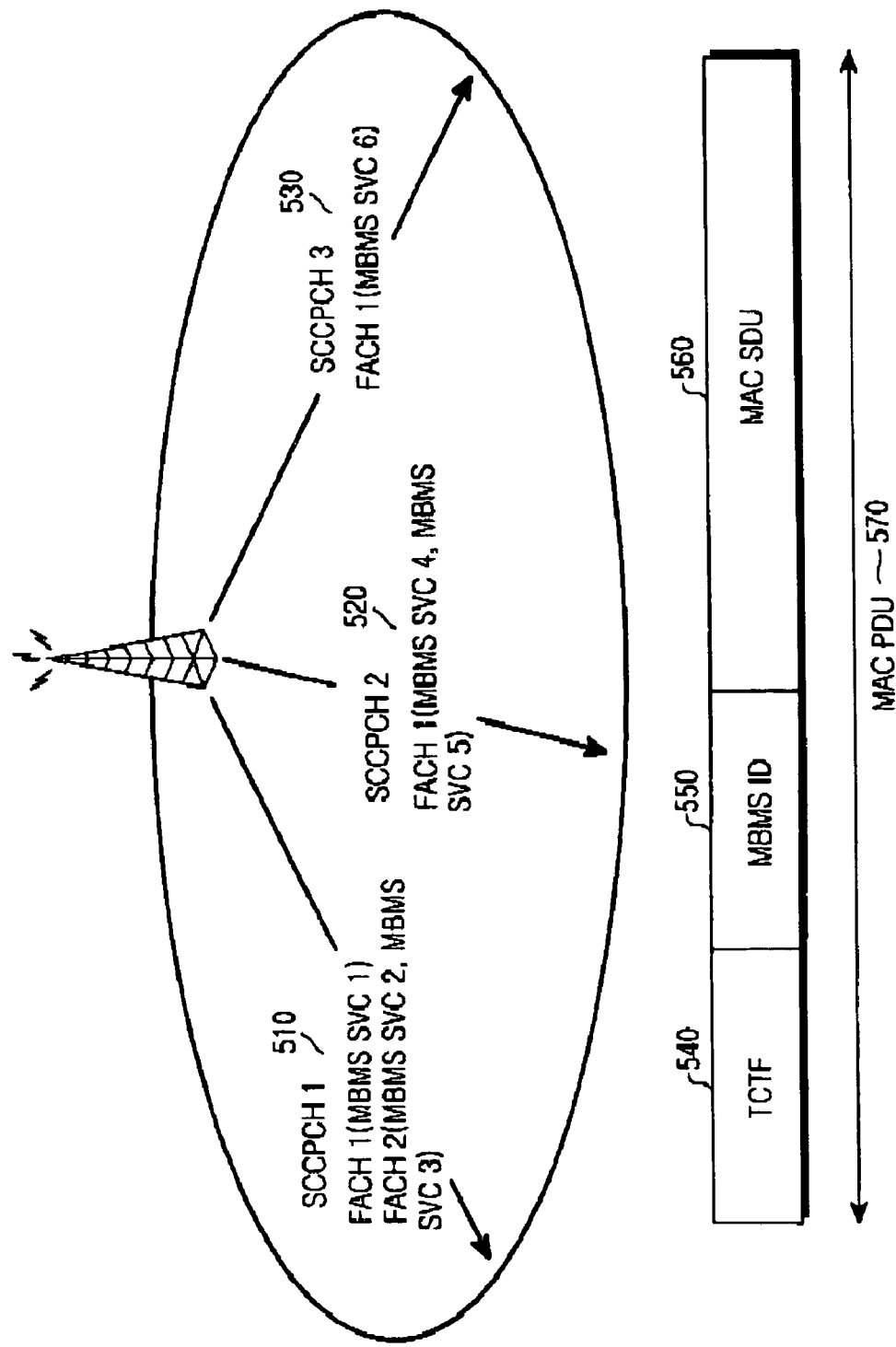
FIG. 2 is a view illustrating a procedure of allocating an MBMS identifier and MBMS transmission data in a mobile communication system according to an embodiment of the present invention.

FIG. 2 is a view illustrating a procedure of allocating an MBMS identifier and MBMS transmission data in a mobile communication system according to an embodiment of the present invention. FIG. 2 illustrates a case in which a plurality of MBMSs are provided in a specific cell.

In general, MBMS data are transmitted through a secondary-common control physical channel (S-CCPCH) and a forward access channel (FACH) which are common channels. Therefore, when a plurality of MBMSs are provided in one cell, a plurality of S-CCPCHs and FACHs can be constructed in one cell. That is, MBMS data into each of which a relevant MBMS identifier is inserted are transmitted through different S-CCPCHs and FACHs in the cell.

For example, it is assumed that six MBMSs are provided in a cell. In addition, it is assumed that MBMS data of MBMS #1 are transmitted through FACH #1 of S-CCPCH #1 510, MBMS data of MBMS #2 and #3 through FACH #2 of S-CCPCH #1 510, MBMS data of MBMS #4 and #5 through FACH #1 of S-CCPCH #2 520, and MBMS data of MBMS #6 through FACH #1 of S-CCPCH #3 530.

In this case, identifiers are inserted into the MBMS data by the MAC layer so that the UEs can differentiate relevant MBMSs.

When six MBMSs are provided as described above, the MBMS #1 is allocated "one" as an identifier, the MBMS #2 is allocated "two" as an identifier, the MBMS #3 is allocated "three" as an identifier, the MBMS #4 is allocated "four" as an identifier, the MBMS #5 is allocated "five" as an identifier, and the MBMS #6 is allocated "six" as an identifier, respectively. The MBMS data which are allocated the identifiers, are transmitted through the S-CCPCH and FACH.

That is, with respect to the MBMS data, the MAC layer makes up a MAC PDU that is a data group into which the MBMS identifier and supplementary information.

The MAC PDU may be made up as indicated by numeral "570" in FIG. 2. The MAC PDU has a MAC SDU field 560 which includes data transmitted by the RLC (Radio Link Control) layer, an MBMS ID field 550 for representing an MBMS to which the MBMS data belong, and a TCTF field 540 for representing the type of a logical channel to which the MBMS data belong.

In other words, a radio network controller (RNC) makes up a MAC PDU 570 according to an MBMS and transmits the made-up MAC PDU 570 to a physical layer. In this case, a value representing an MBMS traffic channel (MTCH) is inserted into the TCTF field 540 and an MBMS identifier for differentiating the MBMS in the MAC layer is inserted into the MBMS ID field 550.

In contrast, a MAC layer of the UE determines whether or not a received MAC PDU is MBMS data corresponding to the MBMS which the UE desires to receive, by checking the MBMS ID field of the MAC PDU 570 transmitted from the physical layer.

Since MBMS data are transmitted through a specific radio channel (i.e., a channel made up by combination of an S-CCPCH and a FACH), it is enough that a user MBMS ID (U-MBMS ID) has a dedicated value only in a specific radio channel (transport channel). That is, the same MBMS identifier can be allocated to different transport channels from each other. For example, although U-MBMS ID #1 is used for MBMS #2 transmitted through FACH #2 of S-CCPCH #1, the U-MBMS ID #1 can be used in channels other than FACH #2 of S-CCPCH #1.

Referring to FIG. 2, it is noted that channels other than FACH #2 of S-CCPCH #1 includes FACH #1 of S-CCPCH #1, FACH #1 of S-CCPCH #2, and FACH #1 of S-CCPCH #3.

Although the same U-MBMS ID is repeatedly used in different transport channels from each other as described above, each UE can receive MBMS data which each UE desires to receive because the respective MBMS data are transmitted only through each specific transport channel.

In order to realize such a function, the present invention proposes a method of allocating U-MBMS IDs to MBMSs so that each MBMS has a dedicated value in a relevant transport channel.

Figure 3:
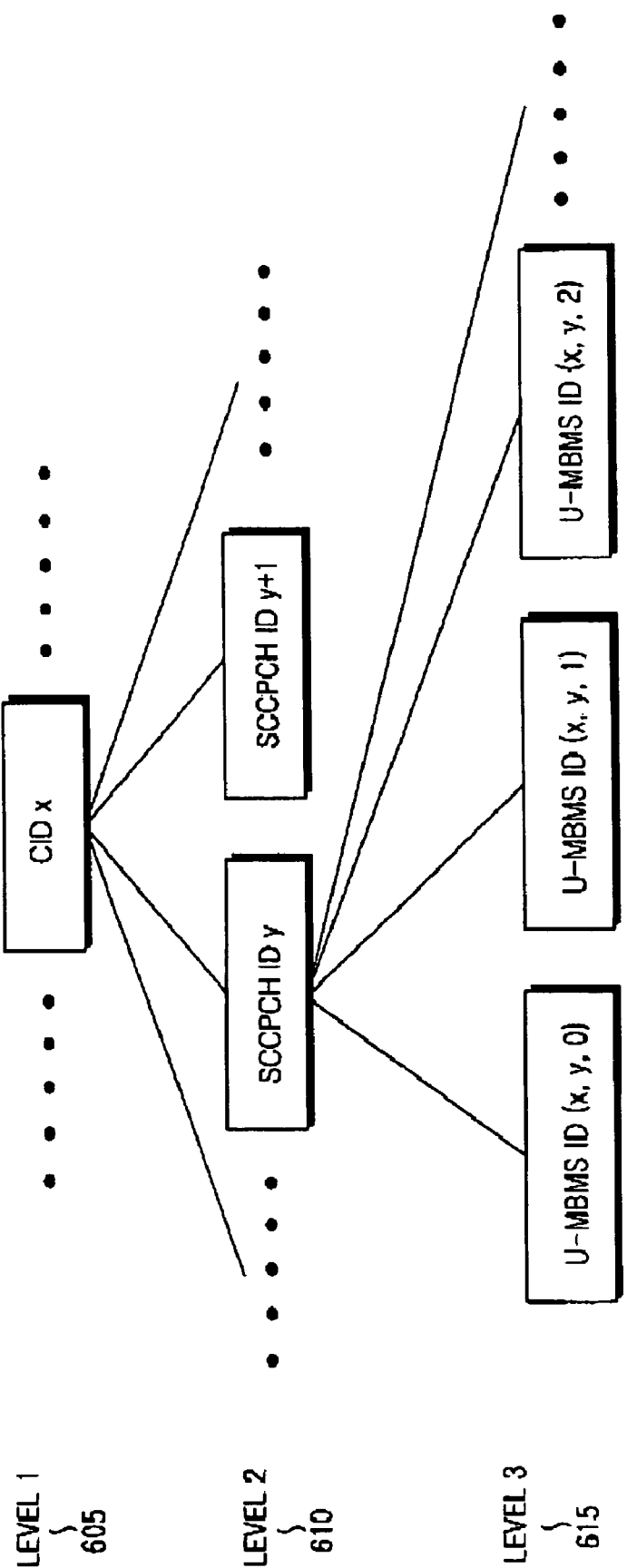
FIG. 3 illustrates a structure for allocating MBMS identifiers for the transmission of MBMS data according to an embodiment of the present invention.

FIG. 3 illustrates an example of allocating MBMS identifiers to MBMS data according to an embodiment of the present invention. That is, FIG. 3 is a view illustrating a structure of MBMS IDs for allocating U-MBMS IDs to the MBMS data.

The MBMS identifier according to an embodiment of the present invention is made up in a tree-type structure having three levels.

The first level 605 is made up with cell identifiers for differentiating cells managed by a controlling RNC (CRNC). The second level 610 is made up with S-CCPCH identifiers for differentiating S-CCPCHs which are established according to each cell. The third level 615 is made up with U-MBMS IDs which are created on the assumption that MBMSs are broadcasted through the S-CCPCHs. Each of the cell identifiers and each of the S-CCPCH identifiers have a dedicated value in each level.

For example, a certain cell identifier has a dedicated value (x) in a CRNC managing a cell and a certain S-CCPCH identifier has a dedicated value (y) in a cell in which the S-CCPCH is established. In the following description, a group of U-MBMS IDs according to each transport channel in a U-MBMS ID pool will be called a U-MBMS ID (a cell identifier, a S-CCPCH identifier) set or the first identifier. For example, the first identifier which is used or will be used in a logical channel having a cell identifier of "x" and an S-CCPCH identifier of "y" is represented as "(x, y)". The specific S-CCPCH includes a plurality of transport channels. Hereinafter, an MBMS identifier made up in the specific S-CCPCH will be called the secondary identifier. When the secondary identifier is made up with four bits, it is possible to differentiate sixteen MBMSs. That is, while sixteen MBMSs per cell can be differentiated when the MBMS ID is made up with four bits according to the prior art, sixteen MBMSs per specific S-CCPCH can be differentiated when the MBMS ID is made up with four bits as shown in FIG. 3. Therefore, as the number of the S-CCPCHs increases, the number of MBMSs which can be transmitted in a specific cell also increases.

That is, when the MBMS ID is made up with four bits and the specific cell includes five S-CCPCHs, the method of the present invention enables the differentiation of eighty MBMSs while the method of the prior art enables the differentiation of only sixteen MBMSS.

In other words, it is noted that the method according to the present invention requires less number of bits than the method of the prior art in order to differentiate the same number of MBMSs.

When the CRNC receives an MBMS to be transmitted to the UEs from a serving GPRS support node (SGSN), the CRNC analyzes MBMS IDs which are currently in use. To this end, the CRNC may store currently allocated MBMS IDs in a predetermined storage unit. Therefore, when the CRNC receives an MBMS, to which an MBMS ID is not yet allocated, to be transmitted to the UEs from the SGSN, the CRNC generates and allocates a new MBMS ID to the relevant MBMS. An aspect of the present invention includes a method of generating and allocating an MBMS ID. The MBMS ID can be allocated using either the MBMS ID pool or a generator. When the MBMS ID is allocated using the MBMS ID pool, an analyzing process for differentiating between allocated MBMS IDs and unallocated MBMS IDs is necessary. Of course, the analyzing process is performed only with respect to MBMS IDs which are allocated to MBMSs transmitted through the same S-CCPCH as that through which the CRNC desires to transmit the received MBMS. Table 1 shows an example of MBMS IDs stored in the storage unit of the CRNC.

TABLE 1

| SCCPCH1 | SCCPCH2 | SCCPCH3 | SCCPCH... | SCCPCHN |
|---------|---------|---------|-----------|---------|
| 0000    | 0000    | 0000    | ...       | 0001    |
| 0001    | 0001    | 0010    | ...       |         |
| 0010    |         |         |           |         |

In Table 1, it is assumed that the CRNC manages N number of S-CCPCHs. The CRNC allocates the MBMS IDs of "0000", "0001", and "0010" (binary) to three MBMSs transmitted through S-CCPCH #1, respectively. Also, the CRNC allocates the MBMS IDs of "0000" and "0001" to two MBMSs transmitted through S-CCPCH #2, respectively. Also, the CRNC allocates the MBMS IDs of "0000" and "0010" to two MBMSs transmitted through S-CCPCH #3, respectively. In addition, the CRNC allocates the MBMS ID of "0001" to one MBMS transmitted through S-CCPCH #N. In a state in which the CRNC supports MBMSs through each S-CCPCH as shown in Table 1, when the CRNC receives a new MBMS requiring the support of the CRNC, the CRNC determines an S-CCPCH and a transport channel to support the received MBMS. When the CRNC determines an S-CCPCH and a transport channel, the CRNC generates an MBMS ID having the lowest value from among unallocated values in the determined S-CCPCH and allocates the generated MBMS ID to the received MBMS. If the CRNC determines to transmit the received MBMS through S-CCPCH #1, the MBMS ID of "0011" is generated, and if the CRNC determines to transmit the received MBMS through S-CCPCH #2, the MBMS ID of "0010" is generated. Also, if the CRNC determines to transmit the received MBMS through S-CCPCH #3, the MBMS ID of "0001" is generated, and if the CRNC determines to transmit the received MBMS through S-CCPCH #N, the MBMS ID of "0000" is generated. The CRNC allocates the generated MBMS ID to the received MBMS and transmits the MBMS to the UE.

Figure 4:
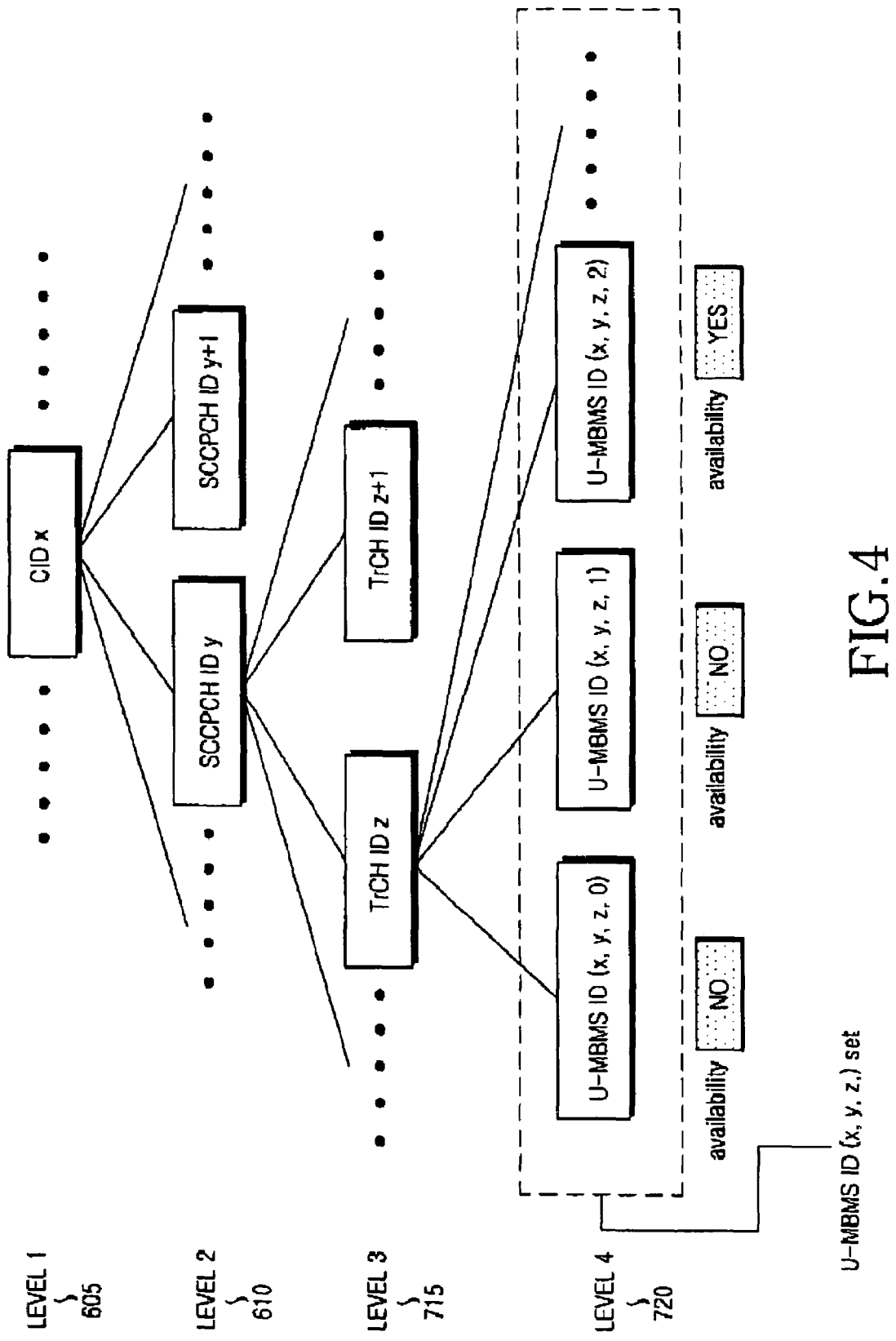
FIG. 4 illustrates a structure for allocating MBMS identifiers for the transmission of MBMS data in a radio network controller according to an embodiment of the present invention.

FIG. 4 illustrates an example of allocating MBMS identifiers to MBMS data according to an embodiment of the present invention. Hereinafter, a method for allocating MBMS identifiers to MBMS data according to an embodiment of the present invention will be described in detail with reference to FIG. 4. Additionally, in the present embodiment, , a method in which the CRNC uses a U-MBMS ID pool in order to allocate U-MBMS IDs to MBMS data will be described as an example. The U-MBMS ID pool is made up in a tree-type structure having four levels.

Referring to FIG. 4, the first level 605 is made up with cell identifiers for differentiating cells managed by the CRNC. The second level 610 is made up with S-CCPCH identifiers for differentiating S-CCPCHs which are established according to each cell. The third level 715 is made up with transport channel identifiers for differentiating transport channels which are made up according to each S-CCPCH. The fourth level 720 is made up with U-MBMS IDs currently used in the transport channel and U-MBMS IDs available for use in the future.

Each of the cell identifiers, the S-CCPCH identifiers, and the transport channel identifiers has a dedicated value in each level. For example, a certain cell identifier has a dedicated value (x) in a CRNC managing the cell, a certain S-CCPCH identifier has a dedicated value (y) in a cell in which the S-CCPCH is established, a certain transport channel identifier has a dedicated value (z) in a S-CCPCH in which the relevant transport channel is made up. In the following description, a group of U-MBMS IDs according to each transport channel in the U-MBMS ID pool will be called a U-MBMS ID (e.g., a cell identifier, a S-CCPCH identifier, and a transport channel identifier respectively) set or the first identifier. For example, the first identifier which is used (or will be used) in a logical channel having a cell identifier of "x", an S-CCPCH identifier of "y", and a transmission identifier of "z" is represented as "(x, y, z)".

The specific transport channel includes a plurality of MBMS identifiers as shown in FIG. 3. Hereinafter, an MBMS identifier made up in the specific transport channel will be called the secondary identifier. When the secondary identifier is made up with four bits, it is possible to differentiate sixteen MBMSs As described above, according to the prior art, it is possible to differentiate sixteen MBMSs per cell if the MBMS ID is made up with four bits. However, according to the present invention, sixteen MBMSs per specific transport channel can be differentiated when the MBMS ID is made up with four bits as shown in FIG. 3.

Therefore, as the number of the transport channels increases, the number of MBMSs which can be transmitted in a specific cell also increases. Table 2 illustrates MBMS identifiers allocated according to an embodiment of the present invention.

TABLE 2

|  | Number of SCCPCH | Number of Transport channels | Number of bits of MBMS ID | Number of MBMS to be differentiated |
|---|---|---|---|---|
| The present invention | 5 | 4 | 4 | 320 |
| The prior art | 5 | 4 |  | 16 |

Table 2 shows the number of MBMSs which can be differentiated in a specific cell when an MBMS ID is made up with four bits. In this case, it is assumed that the specific cell includes five S-CCPCHs and one S-CCPCH is connected with four transport channels. As shown in Table 2, according to the present invention, it is possible to differentiate 320 MBMSs. In contrast, the conventional art may differentiate only sixteen MBMSs.

In other words, the method according to the present invention requires fewer of bits than the method of the prior art in order to differentiate the same number of MBMSs. Meanwhile, each of the secondary identifiers includes a variable which represents availability. The variable is set to "YES" when a corresponding secondary identifier is not allocated, but the variable is set to "NO" once a corresponding secondary identifier has been allocated. The CRNC selects the lowest U-MBMS ID from among U-MBMS IDs (the secondary identifiers) having the availability variable value of 'YES' in the U-MBMS ID set (the first identifiers), and allocates the selected U-MBMS ID to a relevant MBMS.

In the embodiment shown in FIG. 4, the CRNC differentiates MBMSs using the MBMS ID pool in which MBMS IDs (the secondary identifiers) are stored. However, when the CRNC receives MBMS data to be transmitted through a specific transport channel, the CRNC can generate an MBMS ID corresponding to the received MBMS data. That is, when receiving MBMS data to be transmitted through a specific transport channel, the CRNC can generate an MBMS ID which is not overlapped with currently used MBMS Ids. This process will now be described in detail.

When the CRNC receives an MBMS to be transmitted to the UEs from the SGSN, the CRNC analyzes MBMS IDs which are currently in use. To this end, the CRNC may store currently allocated MBMS IDs in a predetermined storage unit. Therefore, when the CRNC receives an MBMS, to which an MBMS ID is not yet allocated, to be transmitted to the UEs from the SGSN, the CRNC analyzes MBMS IDs stored in the storage unit and generates an MBMS ID which is not yet allocated. In this case, the CRNC generates the lowest possible number of MBMS ID from among MBMS IDs which can be generated. Of course, the analyzing process is performed only with respect to MBMS IDs which are allocated to MBMSs transmitted through the same transport channel as that through which the CRNC desires to transmit the received MBMS. Table 3 shows an example of MBMS IDs stored in the storage unit of the CRNC.

TABLE 3

| TrCH #1 | TrCH #2 | TrCH #3 | TrCH # . . . | TrCH #N |
|---------|---------|---------|--------------|---------|
| 0000    | 0000    | 0000    | . . .        | 0001    |
| 0001    | 0001    | 0010    | . . .        |         |
| 0010    |         |         |              |         |

In Table 3, it is assumed that the CRNC manages N number of transport channels. The CRNC allocates the MBMS IDs of "0000", "0001", and "0010" (binary) to three MBMSs transmitted through transport channel #1, respectively. Also, the CRNC allocates the MBMS IDs of "0000" and "0001" to two MBMSs transmitted through transport channel #2, respectively. Also, the CRNC allocates the MBMS IDs of "0000" and "0010" to two MBMSs transmitted through transport channel #3, respectively. The reason why the second MBMS in the transport channel #2 is allocated the MBMS ID of "0010", not the MBMS ID of "0001", is that an MBMS allocated the MBMS ID of "0001" is released after the MBMS allocated the MBMS ID of "0010" starts. In addition, the CRNC allocates the MBMS ID of "0001" to one MBMS transmitted through transport channel #N.

In a state in which the CRNC supports MBMSs through each transport channel as shown in Table 3, when the CRNC receives a new MBMS requiring the support of the CRNC, the CRNC determines a transport channel to support the received MBMS. When the CRNC determines a transport channel, the CRNC generates an MBMS ID having the lowest value from among unallocated values in the determined transport channel and allocates the generated MBMS ID to the received MBMS. If the CRNC determines to transmit the received MBMS through transport channel #1, the MBMS ID of "0011" is generated, and if the CRNC determines to transmit the received MBMS through transport channel #2, the MBMS ID of "0010" is generated. Also, if the CRNC determines to transmit the received MBMS through transport channel #3, the MBMS ID of "0001" is generated, and if the CRNC determines to transmit the received MBMS through transport channel #N, the MBMS ID of "0000" is generated. The CRNC allocates the generated MBMS ID to the received MBMS and transmits the MBMS to the UE. Such a process is performed by a control signal of a control unit of the CRNC.

Figure 5:
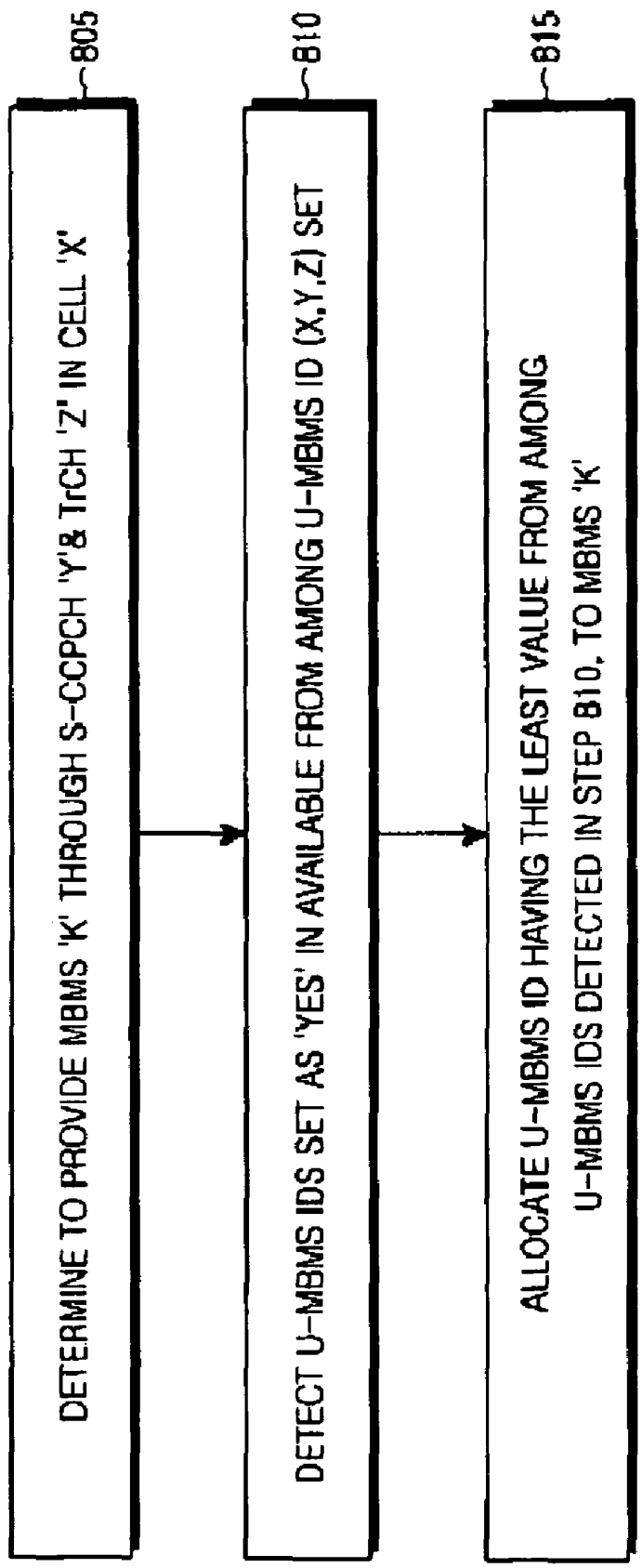
FIG. 5 is a flow diagram illustrating the operation of each node in a mobile communication system supporting an MBMS according to an embodiment of the present invention.

FIG. 5 is a flowchart illustrating a procedure for allocating a U-MBMS ID to a certain MBMS in the CRNC according to an embodiment of the present invention. As described above, the CRNC includes an MBMS ID pool.

In step 805, the CRNC determines a transport channel for transmitting a certain MBMS. In order to determine the transport channel, it precedes to determine a cell and an S-CCPCH to/through which the MBMS is transmitted. In step 805 of FIG. 5, it is shown that the CRNC determines to transmit the MBMS though S-CCPCH "y" and transport channel "z" in cell "x".

In step 810, the CRNC detects an available secondary identifier in the determined transport channel. When the MBMS ID is made up with four bits as described above, the transport channel has sixteen secondary identifiers. The CRNC detects secondary identifiers having a "YES" value in availability from among the sixteen secondary identifiers.

In step 815, the CRNC selects the secondary identifier having the lowest value from among the secondary identifiers detected in step 810, and hereafter, the selected secondary identifier is inserted into an MBMS ID field 550 of user data of the MBMS.

As described above, the CRNC analyzes secondary identifiers already allocated to MBMSs which are transmitted through the determined transport channel in step 815, generates one secondary identifier which does not overlap with the already-allocated secondary identifiers in step 820, and allocates the generated secondary identifier to the certain MBMS.

Figure 6:
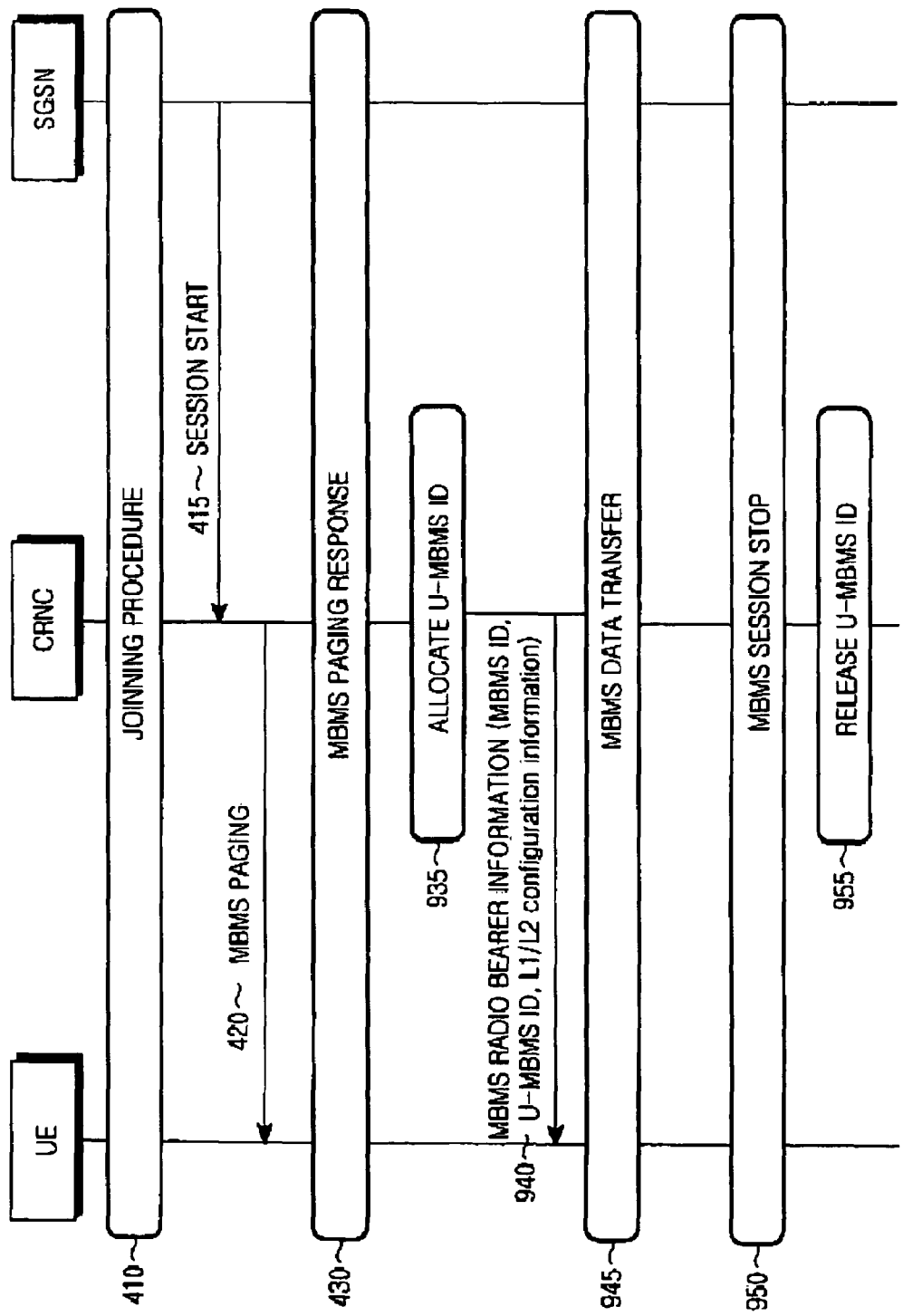
FIG. 6 is a flowchart illustrating a procedure for allocating an MBMS for the transmission of MBMS data according to an embodiment of the present invention.

FIG. 6 is a flow diagram illustrating a procedure for supporting an MBMS to a UE in the CRNC according to an embodiment of the present invention.

In step 410, the UE performs a service joining process with the SGSN. In step 410 (service joining), the UE transmits the own identifier (UE ID) and an identifier of a specific MBMS which the UE desires to receive to the SGSN. Therefore, the SGSN performs an authentication process with respect to the UE and notifies the UE of whether or not the UE can receive the MBMS. Also, in step 410, the SGSN stores a list and locations of UEs which desire to receive the specific MBMS.

Thereafter, when the SGSN recognizes the start of the relevant MBMS from a broadcast and/or multicast service center (BM-SC), the SGSN transmits a session start message to RNCs corresponding to cells in which the UE and other UEs requesting the MBMS are located (step 415). In step 420, the RNC transmits a paging message using a common channel such as an S-CCPCH for the purpose of paging UEs to receive the MBMS. The paging is a process for the SGSN to notify the relevant UEs to request the MBMS. The process of transmitting the paging message is a group paging process and the paging message can be transmitted through an MBMS control channel (MCCH).

In step 430, paged UEs transmit a response message in response to the paging message. By the response message, the RNC can identify the number of UEs which desire to receive the MBMS according to cells and can determine a type of a radio channel to be used in each cell. It is possible that the RNC provides the MBMS through a common channel when a large number of UEs included in a specific cell desire to be provided with the MBMS, and the RNC provides the MBMS to UEs through dedicated channels (which are determined according to the cells) when a small number of UEs included in another specific cell desire to be provided with the MBMS. Herein, the RNC for determining a type of a radio channel is a CRNC.

Therefore, in step 935, the CRNC determines transport channels for providing the MBMS according to cells and allocates a U-MBMS ID, which are determined through the procedure described with reference to FIG. 5, to the MBMS. The U-MBMS ID is specific to each transport channel through with the MBMS is transmitted according to the individual cells. Once a U-MBMSI is assigned to a specific channel, the value of the availability variable of the allocated U-MBMS ID changes from 'YES' to 'NO'.

In step 940, the CRNC transmits an MBMS radio bearer information message through an MCCH and the UE establishes a radio bearer for receiving MBMS data using a received MBMS radio bearer information message. The MBMS radio bearer information message includes a user plane information relating to the user to which the MBMS is provided and the U-MBMS ID which was allocated in step 935. The user plane information includes Orthogonal Variable Spreading Factor (OVSF) code information, transmission format information, RLC information, PDCP (Packet Data Convergence Control) information, etc. The UE having received the MBMS radio bearer information message establishes a physical layer using the OVSF code information, the transmission format information, etc, and establishes an MAC-c/sh/m layer using the U-MBMS ID. Also, the UE establishes an RLC layer and a PDCP layer using the RLC information and the PDCP information.

In step 945, using the user plane established in step 940, the CRNC transmits MBMS data and the UE receives the MBMS data. The MAC-c/sh/m layer of the CRNC makes up a MAC PDU 570 using the U-MBMS ID allocated in step 935 and an MAC SDU transmitted from an upper layer. That is, the U-MBMS ID established in step 935 is inserted into the MBMS ID field 550 shown in FIG. 2. The MAC-c/sh/m layer of the UE determines whether or not to transmit MAC PDUs, which are received from the CRNC, to an upper layer, using the U-MBMS ID received in step 940. That is, the MAC-c/sh/m layer of the UE determines to transmit an MAC PDU to the upper layer only when the value of the MBMS ID field 550 of the received MAC PDU matches with the U-MBMS ID of the MBMS which the UE desires to receive.

In step 950, the session for the MBMS ends, the UE and the CRNC release the user plane established for the MBMS. The session of the MBMS means a period of time in which data of a specific MBMS are provided. Therefore, when the session of the MBMS ends, the user plane established according to the session of the MBMS releases. In step 955, the CRNC releases the U-MBMS ID corresponding to the MBMS the session of which releases. Releasing the U-MBMS ID means to change the availability of a relevant U-MBMS ID in the U-MBMS ID pool from 'NO' to 'YES'.

Additionally, the allocation and release of the U-MBMS ID is performed according to cells to which an MBMS is provided, while the peculiarity of the U-MBMS ID is guaranteed only in a transport channel through which the relevant MBMS is provided. That is, although steps 935 and 940 are steps performed according to cells, the U-MBMS ID allocated/released by the steps is established to have a peculiar value only in each transport channel through which a relevant MBMS is provided in a relevant cell.

Figure 7:
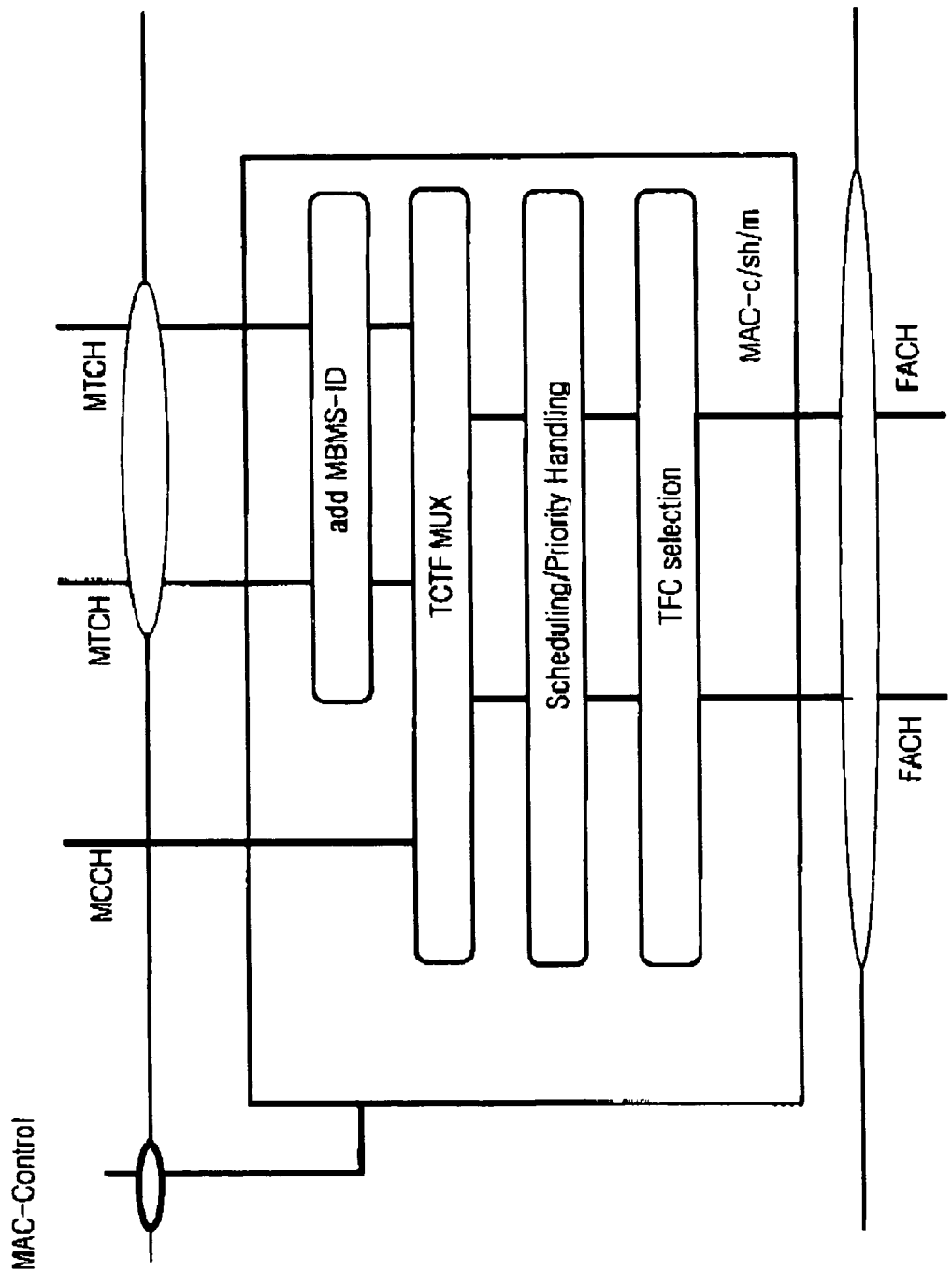
FIG. 7 is a view illustrating a MAC layer of a transmitting party according to an embodiment of the present invention.

FIG. 7 is a view illustrating a MAC-c/sh/m layer of a transmitting party according to an embodiment of the present invention.

An MBMS transmitted through an MTCH is allocated a generated MBMS ID. As described above, the MBMS ID generated according to the present invention has a smaller size than that according to the prior art.

A TCTF is connected to the MBMS having allocated the MBMS ID, the MBMS to which the TCTF has been connected undergoes a scheduling/priority handling process. Thereafter, a transmission format for the MBMS is determined by a selected transmission format combination (TFC) and then the MBMS is transmitted to a receiving party through an FACH using the determined transmission format.

Figure 8:
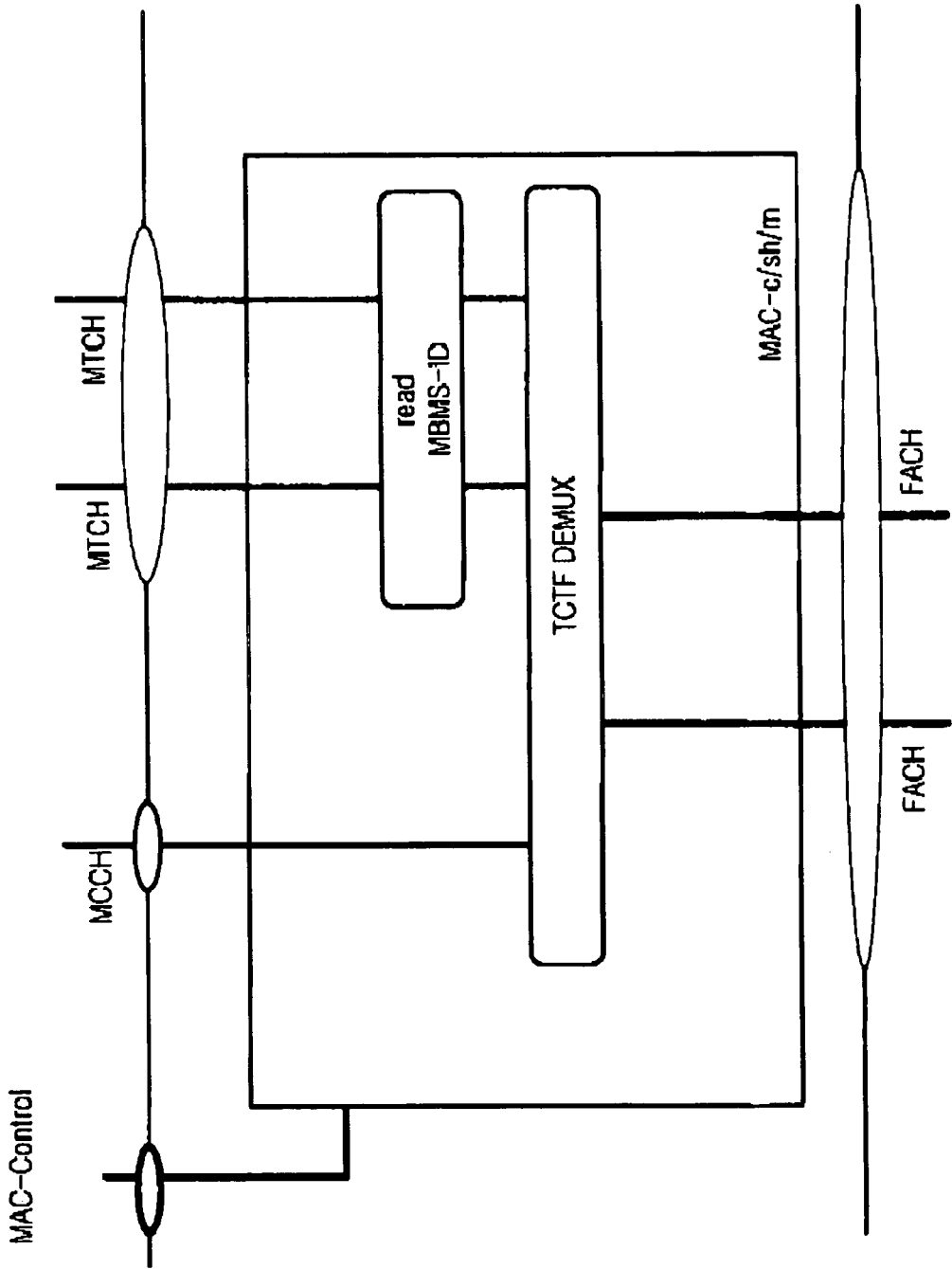
FIG. 8 is a view illustrating a MAC layer of a receiving party according to an embodiment of the present invention.

FIG. 8 is a view illustrating a MAC-c/sh/m layer of a receiving party according to an embodiment of the present invention. A TCTF is separated from an MBMS received through an FACH and then the separated TCTF is transmitted to an MCCH. The MBMS, from which the TCTF is separated, is determined whether or not the MBMS ID allocated to the MBMS matches with the MBMS ID for MBMS which the receiving party desires to receive. As a result when, the two MBMS IDs matches with each other, the MBMS is transmitted to the MBMS Control Channel(MCCH).

As described above, according to the method of the present invention, MBMSs are differentiated according to transport channels or S-CCPCHs. Therefore, the present invention has an advantage of enabling the differentiation of MBMSs using fewer system resources.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for allocating identifiers to packet data by a radio network controller (RNC) for differentiating a plurality of packet data services in a mobile communication system including the RNC for supporting the packet data services and a user equipment (UE) for receiving the packet data service transmitted from the RNC, the method comprising the steps of:
   generating a cell identifier for differentiating cells managed by the RNC;
   generating a channel identifier for differentiating channels constructed according to each cell;
   generating a packet service identifier for differentiating the packet data services in each channel identifier;
   allocating a combination of the cell identifier, the channel identifier, and the packet service identifier to the received packet data service, for identification of the received packet data service; and
   transmitting the allocated packet data service through a determined channel.

2. The method as claimed in claim 1, wherein the packet service identifiers for differentiating the packet data service in the channel identifier are managed using an identification (ID) pool.

3. The method as claimed in claim 2, wherein, the ID pool is managed so as to generate an identifier having a minimum value from among first identifiers which are not overlapped with secondary identifiers allocated to each of packet data services.

4. The method as claimed in claim 1, further comprising the steps of:
   determining a transport channel for transmitting received packet data;
   generating an identifier that is not overlapped with identifiers which are allocated to the packet data services transmitted through a common channel including the determined transport channel;
   allocating the generated identifier to the received packet data service; and
   transmitting the packet data service having been allocated the identifier through the determined channel.

5. The method as claimed in claim 4, wherein, the step of generating an identifier generates an identifier having a minimum value from among first identifiers which are not overlapped with secondary identifiers allocated to the packet data services.

6. The method as claimed in claim 1, further comprising the steps of:
   determining a transport channel for transmitting received packet data;

generating an identifier that is not overlapped with identifiers which are allocated to packet data being transmitted through the determined transport channel; and allocating the generated identifier to the packet data to be transmitted.

7. The method as claimed in claim 6, wherein the identifiers which can be generated according to each channel are identical to each other.

8. The method as claimed in claim 1, wherrein, the step of generating a channel identifier for differentiating channels constructed according to each cell further comprises the steps of:

generating a common channel identifier for differentiating common channels constructed according to each cell; and generating a channel identifier for differentiating channels constructed according to each common channel.

9. An apparatus for allocating identifiers to packet data by a radio network controller (RNC) for differentiating a plurality of packet data services in a mobile communication system including the RNC for supporting the packet data services and a user equipment (UE) for receiving the packet data service transmitted from the RNC, the apparatus comprising:

a storage unit for storing transport channels and cell identifiers, channel identifiers and packet service identifiers, which are allocated to packet data services transmitted through respective transport channels; and a controller for determining a transport channel for transmitting received packet data and for generating a combination of cell identifier, a channel identifier, and a packet service identifier for identification of each packet data service, that is not overlapped with combinations of identifiers which are allocated to each packet data service transmitted through the determined transport channel.

10. The apparatus as claimed in claim 9, wherein the controller generates an identifier having a minimum value from among first identifiers which are not overlapped with secondary identifiers allocated to the respective packet data services.

11. A method for allocating identifiers to packet data by a radio network controller (RNC) for differentiating a plurality of packet data services in a mobile communication system including the RNC for supporting the packet data services and a user equipment (UE) being provided with the packet data service transmitted from the RNC, the method comprising the steps of:

allocating dedicated combinations of cell, channel and packet service identifiers, which are not overlapped with each other, to the packet data by the RNC for differentiating and identifying the packet data services in a transport channel through which the packet data are transmitted; and transmitting the packet data including the dedicated combinations of identifiers to the UE through a determined transport channel.

12. The method as claimed in claim 11, wherein the RNC allocates the dedicated identifier for differentiating the packet data according to forward packet access channels (FACHs).

13. A method for allocating identifiers to packet data by a radio network controller (RNC) for differentiating a plurality of packet data services in a mobile communication system including the RNC for supporting the packet data services and a user equipment (UE) being provided with the packet data service transmitted from the RNC, the method comprising the steps of:

allocating dedicated combinations of cell, channel and packet service identifiers, which are not overlapped with each other, to the packet data by the RNC for differentiating and identifying the packet data services in a physical channel including at least two transport channels; and transmitting the packet data including the dedicated combinations of identifiers to the UE through a determined physical channel.

14. The method as claimed in claim 13, wherein the RNC allocates the dedicated identifier according to secondary-common control physical channels (S-CCPCHs) for differentiating the packet data.

* * * * *